May 9, 1967 A. M. ROBERTS 3,319,000

CIPHERING DEVICE

Filed Sept. 16, 1965 2 Sheets-Sheet 1

INVENTOR.

Alfred M. Roberts.

BY

Christel + Bean

ATTORNEYS.

May 9, 1967 A. M. ROBERTS 3,319,000

CIPHERING DEVICE

Filed Sept. 16, 1965 2 Sheets-Sheet 2

INVENTOR.
Alfred M. Roberts.
BY
Christel + Bean
ATTORNEYS.

3,319,000
CIPHERING DEVICE

Alfred M. Roberts, 36 East Parkway, Wanakah, Hamburg, N.Y. 14075

Filed Sept. 16, 1965, Ser. No. 487,766
11 Claims. (Cl. 178—22)

This invention relates generally to the art of ciphering, and more specifically to a new and useful apparatus for enciphering and deciphering messages. While not necessarily limited thereto, the ciphering apparatus of my invention is particularly suited for use with punched or magnetic tape and the like.

A primary object of my invention is to provide a simple and relatively inexpensive apparatus capable of an astronomical number of ciphering arrangements.

Another object of my invention is to provide the foregoing in an apparatus wherein the ciphering function is quickly and easily set up and changed.

In one aspect thereof, a ciphering apparatus constructed in accordance with my invention is characterized by the provision of multiple input sensors, output means, multiple first energizing circuits for the output means controlled by the input sensors, multiple alternate energizing circuits for the output means, multiple pairs of relay controlled switches with each pair being arranged in series controlling relation to one of the alternate energizing circuits, one relay controlled switch of each pair thereof also being arranged in controlling relation to one of the first energizing circuits, the other relay controlled switch of each pair thereof being controlled by an input sensor, energizing circuits for the one relay controlled switches, including multiple stepping switch devices each having sequentially arranged switch elements each arranged to control an energizing circuit through the associated device, and switch means for connecting individual devices to the various one relay controlled switch energizing circuits in various combinations.

The foregoing and other objects, advantages and characterizing features of the ciphering apparatus of my invention will become clearly apparent from the ensuing detailed description of an illustrative embodiment thereof, the same being depicted in the accompanying drawings wherein like reference numerals denote like parts throughout the various views and wherein.

Figure 1:
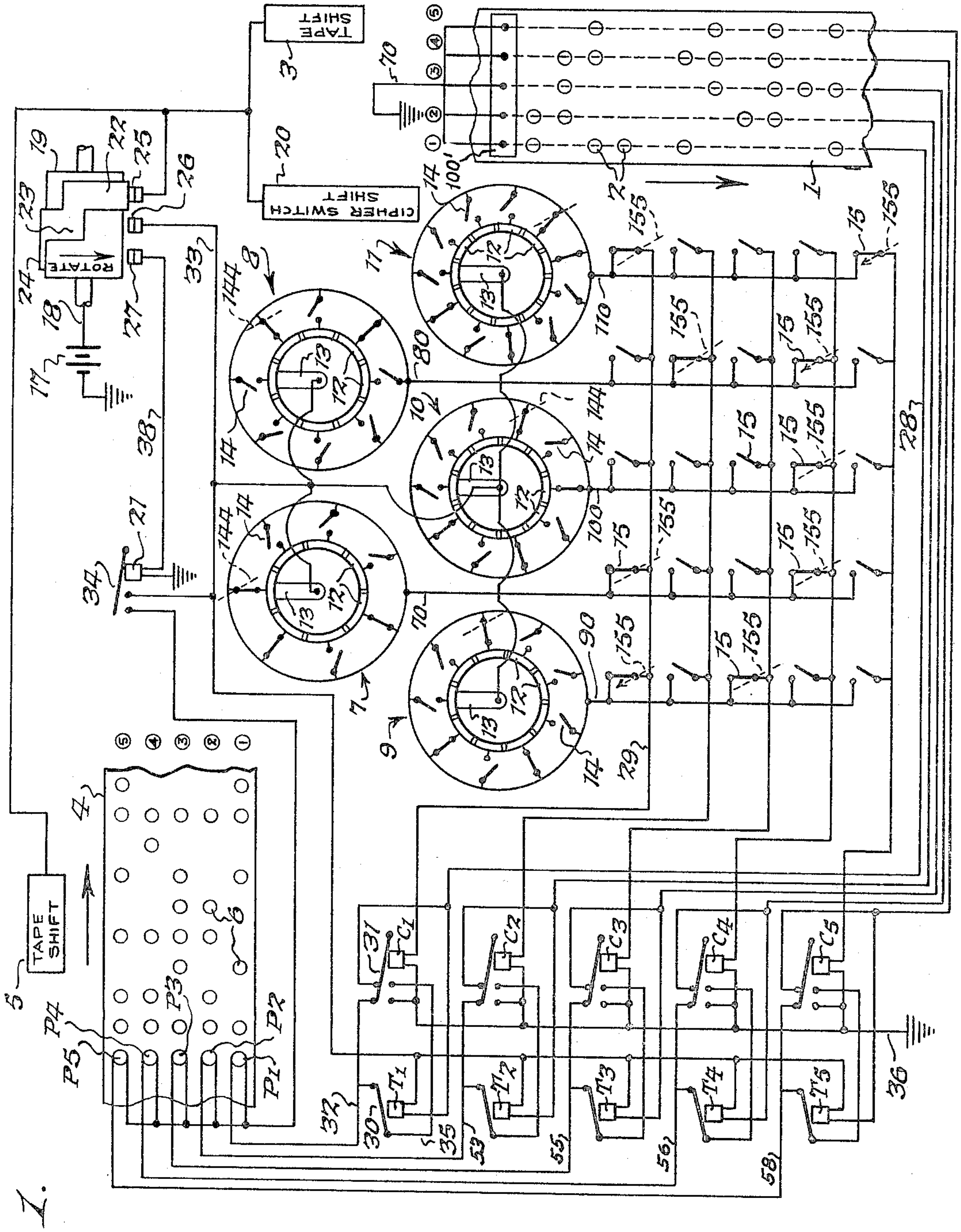
FIG. 1 is a diagrammatic representation of a ciphering apparatus of my invention used in conjunction with a tape punching mechanism.

Referring now to the accompanying drawings, there is shown an illustrative ciphering apparatus of my invention in conjunction with an input medium comprising a tape 1 having information thereon in the form of bits 2. Tape 1 can be magnetic, punched paper, or of any other suitable material and form, and the number of channels thereon can be varied as desired. The illustrated tape is a five channel, punched paper tape such as that used with teletype systems, the customary tracking perforations being omitted for ease of illustration. Tape 1 is driven by any suitable means, such as a conventional stepping motor, generally indicated as a tape shift 3, and the bits 2 are sensed by conventional input sensors, generally indicated as tape reader 100'. Such drive motors and sensors are well known in the art, whereby further description thereof is unnecessary. Tape reader 100' has an input sensor associated with each channel, and each of the five input sensors is arranged to complete a circuit to ground via lead 70 upon sensing a bit 2.

Figures 2, 3, 4, 5, 6, 7:
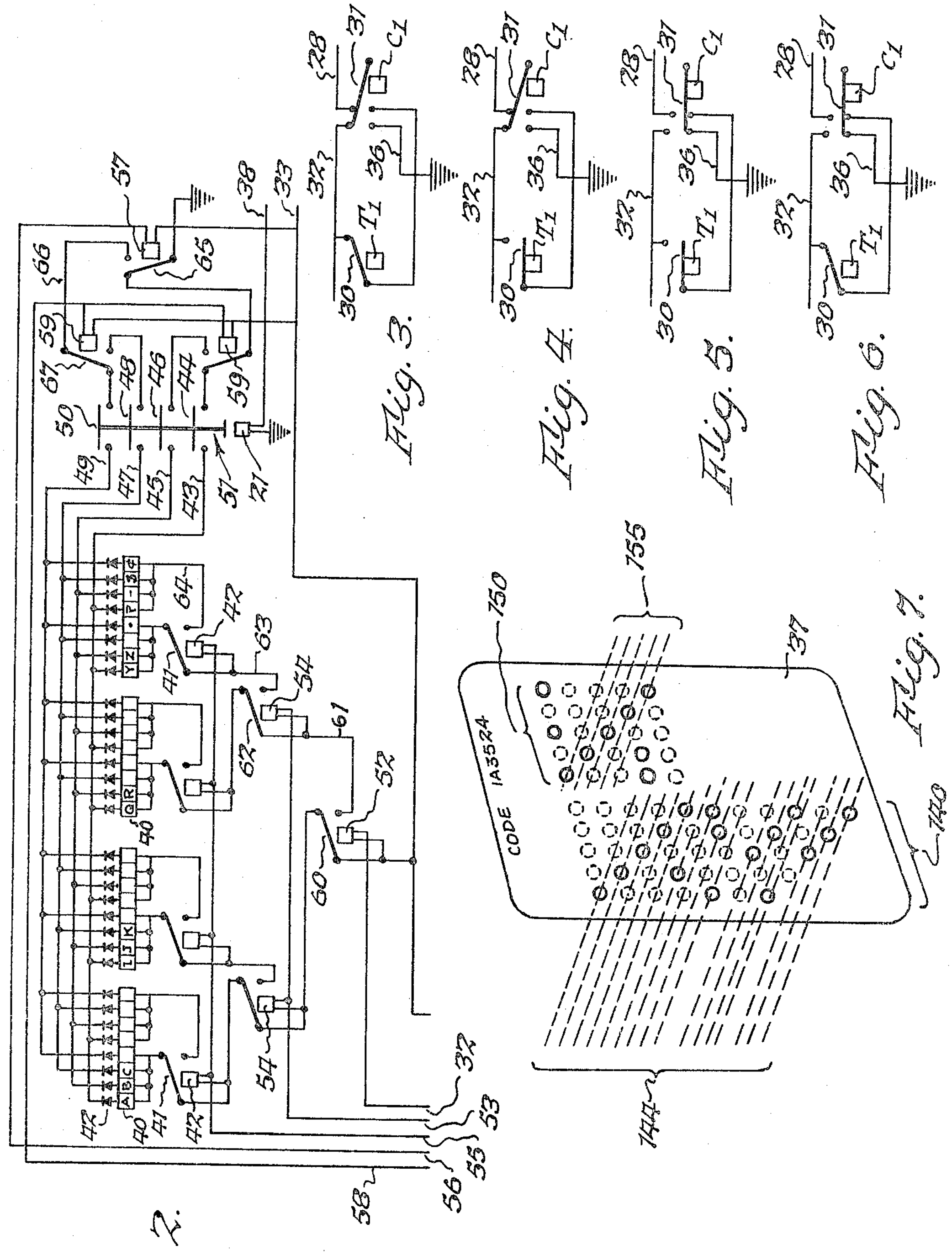
FIG. 2 is a diagrammatic representation of a teletypewriter mechanism useable with the ciphering apparatus of FIG. 1 in place of the tape punch mechanism shown therein.
FIGS. 3, 4, 5 and 6 are corresponding fragmentary, diagrammatic representations of a pair of output control relays used in the ciphering apparatus of FIG. 1, showing the different positions of operation thereof.
FIG. 7 is a perspective view of an illustrative type of code control card useable with the ciphering apparatus of my invention.

The message on input tape 1 is reproduced, in ciphered form, on an output medium comprising a tape 4 which can be identical with tape 1. Tape 4 also is driven by a conventional stepping motor or other tape shift mechanism generally designated 5. In FIG. 1, a series of five punch mechanisms P1–P5 of conventional form are provided for punching bits 6 in output tape 4. In the case of magnetic tape, appropriate magnetizing devices would be used in place of punches P1–P5. In FIG. 2, a teletypewriter is used to reproduce the ciphered message, as will be described.

The energizing circuits for punch mechanisms P1–P5 include a bank of inpunt responsive relays T1–T5, respectively, and a bank of ciphering relays C1–C5, respectively, the relays T1,C1–T5,C5 being paired. Relays T1–T5, if not modified by relays C1–C5, cause the input message to be reproduced at the output, unchanged. Cipher relays C1–C5, when activated, cause the input message to be ciphered.

Cipher relays C1–C5 are actuated by a cipher control section including at least one and preferably several switching devices. In the illustrated embodiment, five sequential switching devices 7, 8, 9, 10 and 11 are provided. While rotary switches are shown, it will be appreciated that other forms of switch can be used. Each switch 7–11 comprises spaced segments 12 successively engaged by a rotary wiper contact arm 13. The number of segments 12 varies, preferably although not necessarily in prime numbers. In the illustrated embodiment, switches 7, 8, 9, 10 and 11 have seven, eight, nine, ten and eleven segments 12, respectively.

Each segment 12 of the respective switches 7–11 is arranged for connection to a common output lead 70, 80, 90, 100 and 110, respectively, for that switch by individual switches 14, and the output lead 70, 80, 90, 100 and 110, respectively, of each switch 7–11 is adapted for connection to any or all of the cipher relays C1–C5 by switches 15. Switches 14, 15 can be conveniently controlled by means of cipher cards as shown at 37 in FIG. 7, although other switch control means can be used.

Power is supplied from a suitable source indicated at 17 via power lead 18 and a master control switch in the form of a rotary timer 19. The contact arms 13 of switches 7–11 are rotated step fashion, segment by segment, in unison, by any conventional shifting or stepping mechanism generally designated 20. Punch mechanisms P1–P5 are energized under control of a master punch relay 21.

Timer 19 has a contact plate connected to power source 17 and formed with three connected segments 22, 23 and 24 which are successively brought into contact with wiper contact elements 25, 26 and 27, respectively. Contact between segment 22 and element 25 energizes the three shift mechanisms 3, 5 and 20, advancing tapes 1 and 4 in step fashion to the succeeding position, and advancing each of the five wiper contact arms 13 one segment 12 starting from the "home" position shown in FIG. 1. Engagement of segment 23 and element 26 provides a power circuit for the ciphering section, for relays T1–T5 and for output punches P1–P5, as will be described. Engagement of segment 24 and element 27 completes an energizing circuit to relay 21 via lead 38 for actuating punch mechanisms P1–P5 under control of the input and cipher sections, as will be described.

Relay pairs T1, C1–T5, C5 are arranged in controlling relation to punches P1–P5, respectively, and each relay pair has a total of four modes of operation. These four modes are shown for relay pair T1, C1 in FIGS. 3–6, it being understood that each of the other relay pairs T2, C2; T3, C3; T4, C4 and T5, C5 have the same four modes of operation.

In the mode of operation depicted in FIG. 3, there is no bit on input tape 1 whereby the grounding circuit to relay T1 via lead 28 and tape reader 100′ is not completed. Consequently, relay T1 is not energized upon engagement of segment 23 and element 26. Cipher relay C1 also is not energized, because no circuit has been completed via the cipher control section and lead 29. In other words, in this mode of operation none of the switching devices 7–11 will be closed and connected to lead 29, whereby lead 29 will not be connected to lead 33. Therefore, switches 30 and 31 remain closed, and punch P1 will not be energized upon actuating relay 21 because the necessary grounding circuit has not been completed, either through lead 36 or through lead 28 and tape reader 100′.

In the mode of operation depicted in FIG. 4, there is an input bit on tape 1, whereby an energizing circuit to relay T1 is completed via lead 33 (FIG. 1), lead 28 and tape reader 100′ upon engagement of segment 23 and element 26. This opens switch 30. However, cipher relay C1 still is not energized, leaving switch 31 closed. This establishes an energizing circuit to punch P1 via lead 33, switch 34, lead 32, switch 31, lead 28 and tape reader 100′, subject to control of punch relay 21.

In both of the foregoing modes of operation the cipher control section has been inactive, whereby the output has duplicated the input for straight, unciphered transmission.

In the mode of operation depicted in FIG. 5, there is an input bit energizing relay T1 which opens switch 30, as in the mode depicted in FIG. 4. However, in the FIG. 5 mode relay C1 also is energized because a power connection has been completed through the cipher section. This opens switch 31, thereby breaking the previously described energizing circuit via leads 28 and 32 to punch P1. Thus, there will be no output bit, notwithstanding the presence of an input bit.

In the mode of operation depicted in FIG. 6, relay C1 is again energized, because a power connection has been completed through the cipher section, causing switch 31 to open the energizing circuit to punch P1 via leads 28 and 32. However, in this mode there is no input bit on tape 1, whereby relay T1 is not energized. As a result, switch 30 remains closed, establishing an alternate energizing circuit for punch P1 via lead 33, switch 34, lead 32, switch 30, lead 35, switch 31 and ground lead 36. Thus, there will be an output bit, notwithstanding the absence of an input bit.

Thus, output punches P1–P5 may or may not be energized, whether or not there is an input bit, depending upon the condition of the cipher section. If the cipher section is inactive, the output punches are energized only when there is an input, producing straight transmission of the input message as indicated by FIGS. 3 and 4. However, where the cipher section is active, as indicated by FIGS. 5 and 6, the output is the reverse of the input. By continuously varying the activity of the cipher section with respect to the different relay pairs T1, C1–T5, C5 during transmission of the message a continuously varying transmission pattern is obtained.

Switches 14 and 15 can be opened and closed by any desired means, activated in any desired manner. One way of accomplishing this is to arrange for actuation of the switches under control of a punched plastic card such as those now used in automatic telephone dialing systems. Such a card is shown at 37 in FIG. 7, and has a first group of punch-outs 140 arranged in columns and rows, there being seven punch-outs in the left-hand vertical column representing the seven individual switches 14 of cipher control switch 7, eight punch-outs in the second vertical column representing the eight individual switches 14 of switch 8, etc. Card 37 also has a second group of punch-outs 150 arranged in columns and rows, there being a vertical column of punch-outs 150 for each of the five switches 7–11 and each vertical column having five punch-outs 150 representing the five switches 15 associated with each switch 7–11.

The various punch-outs 140 and 150 are punched out where it is desired to close the associated switch 14 or 15, and left intact where it is desired to leave the associated switch 14 or 15 open. Through means known in the art and per se no part of my invention, switches 14 and 15 are closed according to the pattern of punch-outs 140 and 150. Such means can assume a wide variety of forms, all known in the art, and are indicated diagrammatically by broken line connections 144 between the closed switches 14 and punch-outs 140 on card 37, and by broken line connections 155 between switches 15 and punch-outs 150 on card 37.

In the illustrated embodiment, switch 7 is connected in controlling relation to relay pairs T1, C1 and T4, C4, switch 8 is connected in controlling relation to relay pairs T2, C2 and T4, C4, switch 9 is connected in controlling relation to relay pairs T1, C1 and T3, C3, switch 10 is arranged in controlling relation to relay pair T4, C4, and switch 11 is arranged in controlling relation to relay pairs T1, C1 and T5, C5. However, this obviously can be changed, as desired, by varying the pattern of closed switches 15. Various switches 14 also are closed, as illustrated, and this too can be varied as desired.

*Example of operation*

Assume that the following alphabet code is used:

| Letter | Channel 1 | 2 | 3 | 4 | 5 | Letter | Channel 1 | 2 | 3 | 4 | 5 |
|---|---|---|---|---|---|---|---|---|---|---|---|
| A | 0 | 0 | 0 | 0 | 0 | Q | + | 0 | 0 | 0 | 0 |
| B | 0 | 0 | 0 | 0 | + | R | + | 0 | 0 | 0 | + |
| C | 0 | 0 | 0 | + | 0 | S | + | 0 | 0 | + | 0 |
| D | 0 | 0 | 0 | + | + | T | + | 0 | 0 | + | + |
| E | 0 | 0 | + | 0 | 0 | U | + | 0 | + | 0 | 0 |
| F | 0 | 0 | + | 0 | + | V | + | 0 | + | 0 | + |
| G | 0 | 0 | + | + | 0 | W | + | 0 | + | + | 0 |
| H | 0 | 0 | + | + | + | X | + | 0 | + | + | + |
| I | 0 | + | 0 | 0 | 0 | Y | + | + | 0 | 0 | 0 |
| J | 0 | + | 0 | 0 | + | Z | + | + | 0 | 0 | + |
| K | 0 | + | 0 | + | 0 | . | + | + | 0 | + | 0 |
| L | 0 | + | 0 | + | + | ¶ | + | + | 0 | + | + |
| M | 0 | + | + | 0 | 0 | $ | + | + | + | 0 | 0 |
| N | 0 | + | + | 0 | + | ¢ | + | + | + | 0 | + |
| O | 0 | + | + | + | 0 | ? | + | + | + | + | 0 |
| P | 0 | + | + | + | + | – | + | + | + | + | + |

where "+" indicates the presence of a bit and "0" indicates that there is no bit. Assume also that switches 14 and 15 are arranged as illustrated in FIG. 1, and that transmission will begin by shifting arms 13 one segment, clockwise from the position shown. The message THE FLEET HAS LEFT will be ciphered and transmitted as follows:

| Code Message | | | | | | Ciphered Message | | | | | |
|---|---|---|---|---|---|---|---|---|---|---|---|
| T | + | 0 | 0 | + | + | + | + | 0 | 0 | + | Z |
| H | 0 | 0 | + | + | + | + | 0 | 0 | + | + | T |
| E | 0 | 0 | + | 0 | 0 | 0 | + | + | + | 0 | O |
| F | 0 | 0 | + | 0 | + | + | 0 | + | + | 0 | W |
| L | 0 | + | 0 | + | + | + | + | 0 | 0 | 0 | Y |
| E | 0 | 0 | + | 0 | 0 | + | 0 | 0 | + | 0 | S |
| E | 0 | 0 | + | 0 | 0 | + | 0 | + | + | 0 | W |
| T | + | 0 | 0 | + | + | 0 | 0 | + | + | 0 | G |
| H | 0 | 0 | + | + | + | 0 | + | + | 0 | + | N |
| A | 0 | 0 | 0 | 0 | 0 | + | 0 | 0 | 0 | + | R |
| S | + | 0 | 0 | + | 0 | 0 | + | + | 0 | 0 | M |
| L | 0 | + | 0 | + | + | 0 | + | 0 | + | + | L |
| E | 0 | 0 | + | 0 | 0 | + | 0 | + | + | 0 | W |
| F | 0 | 0 | + | 0 | + | + | 0 | + | + | 0 | W |
| T | + | 0 | 0 | + | + | 0 | 0 | + | 0 | 0 | E |

Obviously, when set up in the same manner the apparatus will decipher the ciphered message. All that is needed is to know which code [i.e., switch pattern] was used to cipher the message.

Referring now to the output arrangement of FIG. 2, there is shown a teletypewriter mechanism arranged for control by the ciphering apparatus of FIG. 1. Such mechanism comprises groups 40 of individual typewriter key actuating mechanisms, each group 40 comprising in the illustrated embodiment a total of eight key actuating mechanisms which are evenly subdivided under control of a switch 41 actuated by a relay 42. In one position switches 41 are arranged to complete an energizing circuit to the first four key actuating mechanisms of each group 40 thereof. In the other position, switches 41 are arranged to deenergize the first four key actuating mechanisms and energize the second four key actuating mechanisms of each group 40 thereof.

The first and fifth key actuating mechanism of each group 40 is connected via a diode 42 and lead 43 to a switch contact 44. In similar fashion, the second and sixth mechanism of each group are connected via lead 45 to a switch contact 46, the third and seventh via lead 47 to switch contact 48 and the fourth and eighth via lead 49 to switch contact 50. The switch contacts 44, 46, 48 and 50 comprise part of a switch 51 actuated by relay 21, as will be described.

Relay pair T1, C1 is arranged as previously described to complete an energizing circuit via lead 32 to a relay 52. Relay pair T2, C2 is arranged to complete an energizing circuit as previously described via lead 53 to a pair of relays 54. Relay pair T3, C3 is arranged via lead 55 in controlling relation to a total of four relays 42. Relay pair T4, C4 is arranged as previously described in controlling relation via lead 56 to a relay 57, and relay pair T5, C5 is arranged in controlling relation via lead 58 to a pair of relays 59.

Thus, it will be seen that if all of the relay pairs T1, C1–T5, C5 are in the mode depicted in FIG. 4, indicating the presence of an input bit but with the cipher section inactivated, each of the relays 42, 52, 54, 57 and 59 will be activated. This means that relay 52 will move switch 60 from the position shown in FIG. 2 to the alternate position, interrupting the energizing circuit to the first 2 groups 40 of key actuating mechanisms and completing an energizing circuit via leads 33 and 61 to the switch 62 of the right hand relay 54 as viewed in FIG. 2. Relays 54, having been energized, shift switches 62 from the position shown in FIG. 2 to the alternate position, thereby interrupting the energizing circuit to the third group 40 of key actuting mechanisms and completing an energizing circuit via lead 63 to the switch 41 of the extreme right hand relay 42 as viewed in FIG. 2. Relays 42 having been energized, will have moved their switches 41 from the position shown in FIG. 2 to the alternate position, thereby interrupting the energizing circuit to the first four key actuating mechanisms of the right hand group 40 thereof, as viewed in FIG. 2, and completing an energizing circuit via lead 64 to the last four mechanisms in the right hand group 40. All of the other key actuating mechanisms have been disconnected. With relay 57 energized, its switch 65 will be shifted from the position shown in FIG. 2 to the alternate position, interrupting the energizing circuit via switch 51 and leads 43 or 45, as the case may be, and completing an energizing circuit via lead 66 and switch 67. Relays 59, having been energized, will shift their switches 67 from the position shown in FIG. 2 to the alternate position, thereby interrupting the energizing circuit via lead 49 and completing an energizing circuit via lead 47 to be completed when relay 21 is energized to close switch 51. In this way, only the seventh key actuating mechanism of the right hand group 40 thereof, as viewed in FIG. 2, will be energized.

It is believed that the operaiton of the teletypewriter mechanism of FIG. 2 will be obvious from the foregoing description of one set of conditions. The various relays switch from one circuit to another, depending upon whether the relay pairs T1, C1–T5, C5 complete an energizing circuit, and this governs which one of the individual key actuating mechanisms will be actuated when relay 21 is energized.

Thus, it is seen that my invention fully accomplishes its intended objects. While I have disclosed and described in detail only one embodiment of my invention, that has been done by way of illustration only, without thought of limitaion. Variations therein and modifications thereof will naturally occur to those skilled in the art, and it is intended that they be included within the scope of the appended claims. It will be appreciated that while a tape having several channels across the width of the tape is shown, there could instead be a tape arranged with but a single channel, adapted to step five places at a time so that five-bit messages could be transmitted thereon.

Having fully disclosed and completely described my invention, and its mode of operation, what I claim as new is:

1. Ciphering apparatus comprising output means, multiple first energizing circuits for said output means, multiple input sensors arranged in controlling relation to said first energizing circuits, multiple second energizing circuits for said output means, multiple cipher switch means arranged in controlling relation to said first and second energizing circuits, multiple stepping switch devices arranged in controlling relation to said cipher switch means, and multiple input switch means arranged in controlling relation to said second energizing circuits, said first energizing circuits being independent of said input switch means, and said input sensors being arranged in controlling relation to said input switch means.

2. Ciphering apparatus as set forth in claim 1, together with means for selectively connecting each of said stepping switch devices in controlling relation to one or simultaneously to several or all of said cipher switch means, and means for selectively varying the pattern of opening and closing of said stepping switch devices.

3. Ciphering apparatus comprising output means, multiple first energizing circuits for said output means, multiple input sensors arranged in controlling relation to said first energizing circuits, multiple alternate energizing circuits for said output means, multiple cipher switch means arranged in controlling relation to said first and alternate energizing circuits, multiple stepping switch devices arranged in controlling relation to said cipher switch means, and multiple input switch means arranged in controlling relation to said alternate energizing circuits in series with said cipher switch means and out of controlling relation to said first energizing circuits said input sensors being arranged in controlling relation to said input switch means.

4. Ciphering apparatus comprising output means, a plural number of first energizing circuits for said output means, a corresponding number of input sensors each arranged in controlling relation to one of said first energizing circuits, a corresponding number of second energizing circuits for said output means, a corresponding number of cipher switch means each arranged in controlling relation to one of said first energizing circuits and to one of said second energizing circuits, a corresponding number of input switch means each arranged in controlling relation to one of said second energizing circuits, each of said input sensors being arranged in controlling relation to one of said input switch means, and energizing circuits for said cipher switch means including multiple stepping switch devices and switch means for selectively connecting each of said stepping switch devices in controlling relation to any desired combination of said cipher switch means, each of said stepping switch devices being adapted to sequentially open and close an associated cipher switch energizing circuit.

5. Ciphering apparatus comprising multiple input sensors, output means, multiple first energizing circuits for said output means controlled by said input sensors, multiple alternate energizing circuits for said output means, multiple pairs of relay controlled switches each arranged in series controlling relation to one of said alternate energizing circuits, one relay controlled switch of each pair thereof also being arranged in controlling relation to one of said first energizing circuits, the other relay controlled switch of each pair thereof being controlled by one of said input sensors, energizing circuits for said one relay controlled switches including multiple stepping switch devices each having sequentially arranged switch elements each arranged to control an energizing circuit through the associated device, and switch means for connecting any of said devices to any combination of said one relay controlled switch energizing circuits.

6. Ciphering apparatus comprising input means, output means, a first energizing circuit for said output means, said input means being arranged in controlling relation to said first energizing circuit, a second energizing circuit for said output means, first control switch means arranged in controlling relation to said second energizing circuit, second control switch means arranged in controlling relation to both said first and said second energizing circuits, said first energizing circuit being independent of said first control switch means, said input means also being arranged in controlling relation to said first control switch means, sequentially operable cipher switch means arranged in controlling relation to said second control switch means, feed means associated with said input means, and means synchronized with said feed means for sequentially operating said cipher switch means.

7. Ciphering apparatus comprising input means, output means, a first energizing circuit for said output means, said input means being arranged in controlling relation to said first energizing circuit, a second energizing circuit for said output means, first control switch means arranged in controlling relation to said second energizing circuit, second control switch means arranged in controlling relation to both said first and said second energizing circuits, said first energizing circuit being independent of said first control switch means, said input means being arranged in controlling relation to said first control switch means, stepping switch means, and switch means for connecting said stepping switch means in controlling relation to said second control switch means, said stepping switch means being adapted to sequentially open and close an energizing circuit to said second control switch means.

8. Ciphering apparatus comprising input means, output means, multiple first energizing circuits for said output mean, said input means being arranged in controlling relation to said first energizing circuits, multiple second energizing circuits for said output means, first control switch means arranged in controlling relation to said second energizing circuits, second control switch means arranged in controlling relation to both said first and said second energizing circuits, said input means being arranged in controlling relation to said first control switch means, multiple stepping switch devices, and switch means for connecting any of said stepping switch devices in controlling relation to any one or more of said second control switch means.

9. Ciphering apparatus comprises input means having multiple channels adapted to contain information in bit form, output means for each input channel, energizing circuit means for each of said output means, paired first and second relay means arranged in controlling relation to each of said energizing circuit means, said first relay means being responsive to said input means, said first relay means and said input means being arranged to cause energization of said output means in accordance with the presence of bits on said input responsive means, said second relay means being arranged to cause energization of said output means conversely to the presence and absence of bits on said input means, sequentially operable switching means arranged in controlling relation to said second relay means, means for feeding input information to said input means, means synchronized with said input feed means for sequentially operating said switching means, and means for selectively connecting said sequentially operable switching means in controlling relation to any desired combination of said second relay means.

10. Ciphering apparatus comprising input means having multiple channels adapted to contain information in bit form, output means for each input channel, energizing circuit means for each of said output means, paired first and second relay means arranged in controlling relation to each of said energizing circuit means, said first relay means being responsive to said input means said first relay means and said input means being arranged to cause energization of said output means in accordance with the presence of bits on said input responsive means, said second relay means being arranged to cause energization of said output means conversely to the presence and absence of bits on said input means, sequentially operable switching means arranged in controlling relation to said second relay means, means for feeding input information to said input means, means synchronized with said input feed means for sequentially operating said switching means, and means for selectively connecting said sequentially operable switching means in controlling relation to one or several or simultaneously to all of said second relay means, said sequentially operable switching means being arranged to sequentially open and close an energizing circuit to the associated second relay means, and means for selectively varying the pattern of opening and closing of said sequentially operable switching means.

11. Ciphering apparatus as set forth in claim 10, wherein said means for selectively connecting said sequentially operable switching means in controlling relation to said second relay means and said means for selectively varying the pattern of opening and closing of said sequentially operable switching means include a punched control card.

References Cited by the Examiner

UNITED STATES PATENTS

| | | | |
|---|---|---|---|
| 1,522,775 | 1/1925 | Friedman | 178—22 |
| 2,785,224 | 3/1957 | Ehrat | 178—22 |

NEIL C. READ, *Primary Examiner.*

T. A. ROBINSON, *Assistant Examiner.*